United States Patent
Makowski et al.

(10) Patent No.: US 10,094,336 B2
(45) Date of Patent: Oct. 9, 2018

(54) ARTICULATED DIFFUSER AND DOOR FOR SUBMERGED RAM AIR TURBINE POWER AND COOLING CONTROL

(71) Applicant: Raytheon Company, Waltham, MA (US)

(72) Inventors: Maciej D. Makowski, Redondo Beach, CA (US); David A. Vasquez, Gardena, CA (US)

(73) Assignee: Raytheon Company, Waltham, MA (US)

( * ) Notice: Subject to any disclaimer, the term of this patent is extended or adjusted under 35 U.S.C. 154(b) by 1376 days.

(21) Appl. No.: 14/255,902

(22) Filed: Apr. 17, 2014

(65) Prior Publication Data

US 2016/0215731 A1 Jul. 28, 2016

(51) Int. Cl.
*F02K 3/075* (2006.01)
*F02C 7/042* (2006.01)

(52) U.S. Cl.
CPC .............. *F02K 3/075* (2013.01); *F02C 7/042* (2013.01); *F05D 2220/80* (2013.01)

(58) Field of Classification Search
CPC ....... B64D 41/007; F02K 3/075; F01D 17/14; F01D 17/143; F01D 17/105; F02C 7/042
See application file for complete search history.

(56) References Cited

U.S. PATENT DOCUMENTS

| | | | |
|---|---|---|---|
| 4,175,384 A | 11/1979 | Wagenknecht et al. | |
| 4,291,782 A * | 9/1981 | Klees | F02K 1/44 181/215 |
| 4,409,788 A * | 10/1983 | Nash | F02K 1/822 415/157 |
| 4,501,393 A * | 2/1985 | Klees | F02K 1/1207 181/215 |
| 5,505,587 A | 4/1996 | Ghetzler | |
| 5,694,768 A | 12/1997 | Johnson et al. | |
| 6,270,309 B1 * | 8/2001 | Ghetzler | B64D 41/007 137/15.1 |
| 2002/0122717 A1 | 9/2002 | Ghetzler et al. | |

FOREIGN PATENT DOCUMENTS

GB 2243877 A 11/1991

* cited by examiner

*Primary Examiner* — Justin Seabe

(57) ABSTRACT

A turbine exhaust system including a bypass fluid duct that includes: an outer exit shroud and an inner mold line (IML) forming a channel from an inlet to an outlet of the bypass fluid duct, a moveable diffuser configured to move between a forward and aft locations, and a door configured to pivot between minimum and maximum door angles, wherein the moveable diffuser and the door together form the outer exit shroud. The bypass fluid duct is configured to: receive an incoming fluid stream in a first direction through the inlet; bypass the incoming fluid stream around a turbine generator; and direct a flow path of the incoming fluid stream from the inlet through the outlet to join an ambient fluid flow. A movement of the door and the diffuser, from an unextended position to a fully or partially extended position varies a shape and volume of the channel.

22 Claims, 13 Drawing Sheets

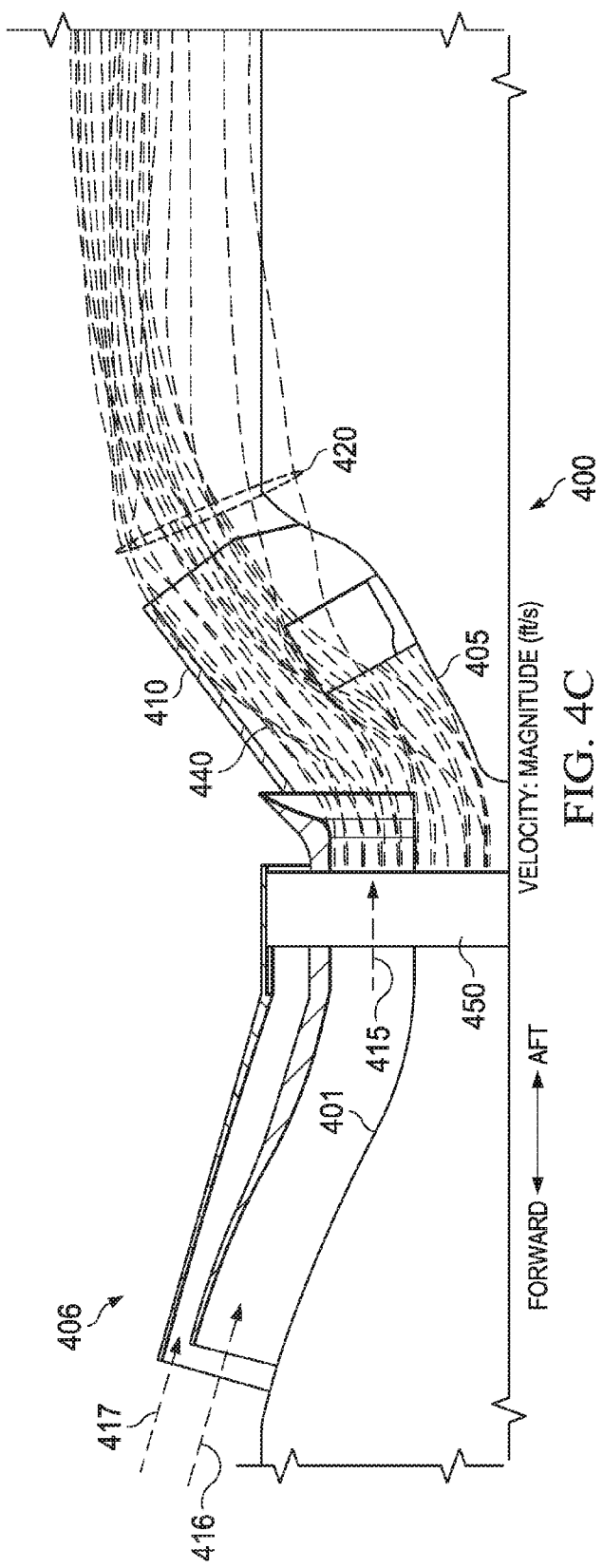

US 10,094,336 B2

ARTICULATED DIFFUSER AND DOOR FOR SUBMERGED RAM AIR TURBINE POWER AND COOLING CONTROL

TECHNICAL FIELD

The present disclosure is directed in general to ram air turbine devices, and more particularly to an articulated diffuser and door for submerged ram air turbine power and cooling control.

BACKGROUND OF THE DISCLOSURE

A variety of mechanical devices, such as engines, turbines, generators, compressors, combustion chambers, and pumps, extract energy from or impart energy on a fluid. These devices may include fluid inlet and exhaust systems. In some deployments, inlet and exhaust systems may affect overall device performance.

SUMMARY OF THE DISCLOSURE

To address one or more of the above-deficiencies of the prior art, one embodiment described in this disclosure provides a turbine exhaust system. The turbine exhaust system includes a bypass fluid duct. The bypass fluid duct includes an outer exit shroud and an inner mold line (IML) forming a channel from an inlet of the bypass fluid duct to an outlet of the bypass fluid duct. The bypass fluid duct also includes a moveable diffuser and a door that together form the outer exit shroud. The bypass fluid duct configured to: receive an incoming fluid stream in a first direction through the inlet; bypass the incoming fluid stream around a turbine generator; and direct a flow path of the incoming fluid stream from the inlet through the outlet to join an ambient fluid flow. The moveable diffuser is configured to move from a forward location to an aft location. The door is configured to pivot from a minimum door angle to a maximum door angle. A movement of the door and the movable diffuser, from an unextended position to one of a fully extended position or a partially extended position between the unextended and fully extended positions, varies a shape and volume of the channel.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4C illustrates a cross sectional view of an inlet and exhaust system including an articulated diffuser and a door for submerged ram air turbine power and cooling control with the door disposed at a 38 degree door angle;

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

A jammer pod generates power at a range of altitudes, mach numbers, and air temperatures. The jammer pod can be coupled to an aircraft structure. The performance envelope of requirements includes an x-axis that corresponds to speed (measured in Mach number), and the y-axis corresponds to altitude. At high altitudes, the ambient temperature is cold, but the air density is low. Therefore, little cooling is required, but high levels of air flow are needed to generate power. In the opposite corner of the performance envelope, at low altitude, the air temperature is warm and dense, where it is easy for the jammer pod to generate power, but difficult to reject waste heat. Embodiments of the present disclosure control power and cooling to improve ram air turbine (RAT) performance over the entire performance envelope. Embodiments of the present disclosure use high Mach number (for example SR-71) techniques for supersonic flow in different domain and flow regimes. Embodiments of the present disclosure use an articulating diffuser to control cooling capacity of heat exchangers embedded in the jammer pod. Embodiments of the present disclosure include a method and a single actuator mechanism to control a plurality of doors (e.g., left and right) and a plurality of articulating diffusers (e.g., left and right corresponding to each door).

Technical advantages of certain embodiments of the present disclosure include improved efficiency of a RAT generator by using a moving diffuser in the exhaust of the RAT.

Figure 1:
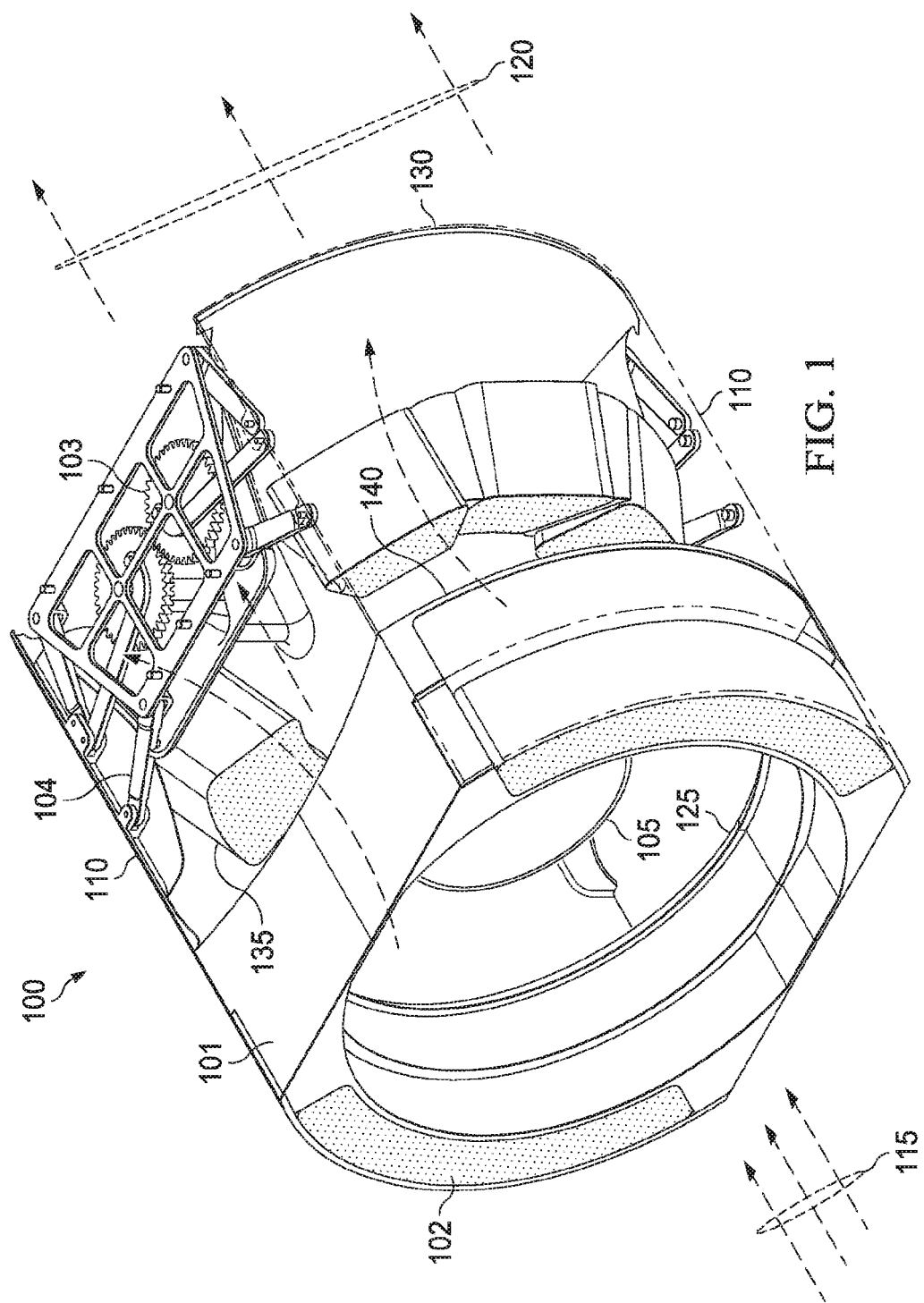
FIG. 1 illustrates a three dimensional isometric view of an exhaust system.

FIG. 1 illustrates a three dimensional isometric view of an exhaust system, according to an embodiment of the disclosure. Although certain details will be provided with reference to the components of the exhaust system 100, it should be understood that other embodiments may include more, less, or different components. That is, other embodiments could be used without departing from the scope of this disclosure.

The exhaust system 100 includes a forward inter mold line (IML) 101, a forward heat exchanger 102, a crank rocker drive mechanism 103, a four-bar suspension 104, and a bypass fluid duct (BFD) including an aft IML 105 and a door 110. The exhaust system 100 receives an incoming fluid stream 115 from a turbine and outputs the fluid as an outgoing fluid stream 120 to join an ambient fluid flow. For example, the incoming fluid stream 115 can be exhaust, pressurized by and discharged from a ram air turbine (RAT) within a vessel, such as an airplane or pod. In certain embodiments, the exhaust system 100 reduces the pressure of the fluid such that the outgoing fluid stream 120 has a lower pressure than the incoming fluid stream 115. In certain configurations, the exhaust system 100 has a 28 inch length from inlet to outlet, a 23.1 inch spanned bulk head that holds the ram air turbine generator (RAT-G) in place; and the ram air turbine generator (RAT-G) includes an 11.5 inch inner diameter around the aft IML 105 and a 21.75 inch outer diameter, which is the diameter of the inlet of the BFD. Other configurations may have other lengths and diameters.

The exhaust system 100 includes at least one forward IML 101. The forward IML 101 encloses the forward heat exchanger 102, the RAT, a RAT generator, and a bypass diffuser 140.

The exhaust system 100 includes one or more forward heat exchangers 102. In the example shown the exhaust system 100 includes a total of two (2) forward heat exchangers 102 that are single pass heat exchangers. Other types of heat exchangers can be used based on volume allocation.

The exhaust system 100 includes a single actuator crank rocker drive mechanism 103. In the configuration of FIG. 1, the crank rocker drive mechanism 103 opens the door 110 in less than one second, and closes the door 110 in less than one second. The crank rocker drive mechanism 103 is disposed over the center of the BFD and is coupled to each door 110 of the BFD. In certain embodiments, a first portion of the crank rocker drive mechanism 103 is disposed over the center of the BFD, and a second, mirror-image-identical portion of the crank rocker drive mechanism 103 is disposed under the center of the BFD.

The four-bar suspension 104 is coupled to each door 110 and to the crank rocker drive mechanism 103. The four-bar suspension 104 allows the door to travel between a minimum door angle (for example, 0°) and a maximum door angle (for example, 38°).

The exhaust system 100 includes at least one aft IML 105. The aft IML 105 encloses the RAT generator (RAT-G), a RAT pump, cables, and an actuator. That is, an interior surface of the aft IML 105 surrounds the RAT-G, RAT pump, cables, and the actuator. The aft IML 105 includes an oval shaped lateral cross-section and a truncated bell shaped axial cross-section. The aft IML 105 prevents fluid from the incoming fluid stream 115 from entering an interior of the aft IML 105. That is, the aft IML 105 allows the fluid of the incoming fluid stream 115 to flow only across the outer surface of the aft IML 105.

The exhaust system 100 includes one or more doors 110. In certain embodiments, the exhaust system 100 includes two doors 110—one door 110 on each side of the BFD. In FIG. 1, one door 110 is translucent, dimly shaded, for convenience of illustrating and describing the interior components of the exhaust system 100 that would be otherwise hidden by an opaque door 110. The length of the door 110 extends between the bypass diffuser 140 and the aft end of the aft IML 105. The shape of the door 110 is arced to correspond to the cylindrical shape of the exhaust system 100. In certain configurations, the door is 0.25 inches thick; however, other thicknesses may be utilized. In operation, the door 110 opens and closes to meet the performance needs of the RAT within the vessel or pod. When the door 110 is closed, the exterior surface of the door is flush with the exterior surface of the pod. In the example shown in FIG. 1, the door 110 is closed at the door angle is 0°. In the embodiment shown, the crank rocker drive mechanism 103 opens the door 110 by driving, such as by linear translation, the door 110 aftward (down stream), away from the bypass diffuser 140. In certain embodiments, the door 110 includes a fixed door hinge, but the aftward (down stream) linear translation by the crank rocker drive mechanism 103 is a better solution to meet the performance needs of the RAT.

The exhaust system 100 includes at least one bypass fluid duct that receives the incoming fluid stream 115 through an inlet 125 of the BFD, bypasses the fluid along the external surface of the aft IML 105 and around the RAT-G, and directs the flow path of the fluid from the inlet 125 through an outlet 130 of the BFD to join the ambient fluid flow. The bypass fluid duct regulates the ram air turbine back pressure and aft heat exchanger flow. The bypass fluid duct includes a channel from the inlet 125 to the outlet 130. For example, the channel can be ring shaped, where the aft IML 105 forms the inner boundary of the ring, and where the door and bypass diffuser 140 together form the outer boundary of the ring. In this example, the flow path of the fluid of the incoming fluid stream 115 is directed through the volume of channel between the inner and outer boundaries of the ring shaped channel (i.e., between the exterior surface of the aft IML 105 and interior surfaces of the bypass diffuser 140 and door 110. The bypass diffuser 140 and the door 110 together form an outer shroud of the BFD.

The exhaust system 100 includes one or more aft heat exchangers 135 based on volume allocation. In the example shown, the exhaust system 100 includes a total of six aft heat exchangers 135. In certain embodiments, each aft heat exchanger 135 has a cross sectional surface area of approximately 32 square inches. The aft heat exchangers 135 are coupled to the exterior surface of the aft IML 105. That is, the aft heat exchangers 135 are disposed within the channel of the BFD. The flow path of the fluid of the incoming fluid stream 115 is directed through the aft heat exchangers 135. The flow path is shown by the curved arrows through the heat exchangers 135 and the straight arrow above the center of the aft IML 105. When the door 110 is open, a first portion of the fluid of the incoming fluid stream 115 flows through the aft heat exchangers 135, and a second portion of the fluid of the incoming fluid stream 115 flows over the aft heat exchangers 135. In embodiments where the crank rocker drive mechanism 103 moves the door aft, a third portion of the fluid of the incoming fluid stream 115 flows out of the exhaust system 100 through an opening between the bypass diffuser 140 and the forward-most end of the door 110. As a result, the third portion of the fluid exits the BFD without flowing over the aft heat exchangers 135.

In certain embodiments, the exhaust system 100 includes a mechanism to articulate the aft heat exchangers 135 to increase the ratio of the amount of fluid in the first portion flowing through the aft heat exchangers 135 to the amount of fluid in the second portion flowing over the aft heat exchangers 135. In other words, the exhaust system 100 includes a mechanism to articulate the aft heat exchangers 135 to increase the percentage of the total amount of fluid in the incoming fluid stream 115 that is within the first portion of the fluid flowing through aft heat exchangers 135. However, embodiments including a mechanism to articulate the aft heat exchangers 135 are more complex than embodiments including an articulating diffuser, discussed more particularly below.

Figure 2:
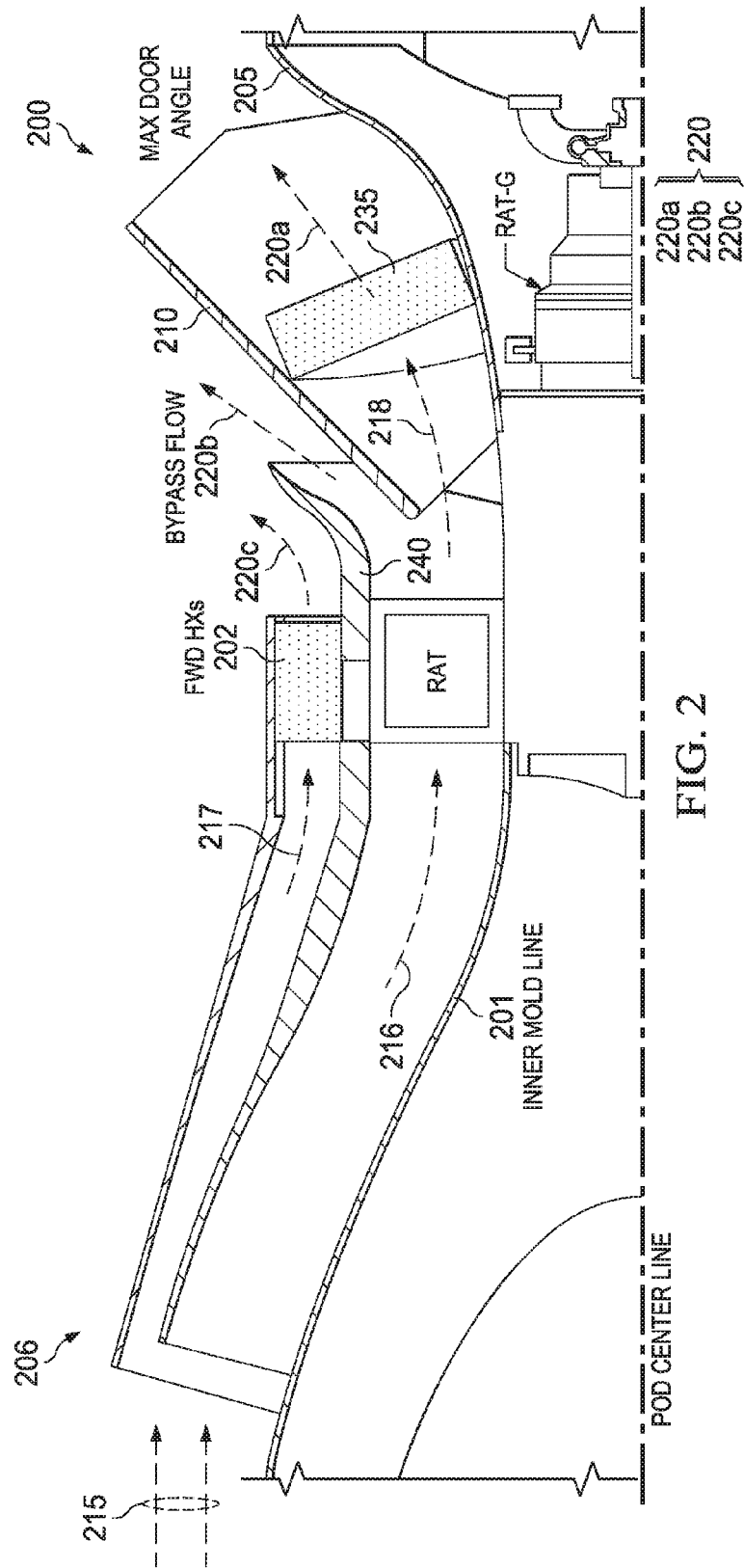
FIG. 2 illustrates a cross sectional view of an inlet and exhaust system including a fixed diffuser and a door disposed at a maximum door angle.

FIG. 2 illustrates a cross sectional view of an inlet and exhaust system including a fixed diffuser and a door disposed at a maximum door angle. The inlet and exhaust system is centered about a longitudinal axis of symmetry of a pod. The inlet and exhaust system includes an inlet system 206, a ram air turbine RAT, and exhaust system 200. The inlet and exhaust system receives an incoming fluid stream 215 and outputs an outgoing fluid stream 220, which may be similar to the incoming fluid stream 115 and outgoing fluid stream 120 in FIG. 1. Although certain details will be provided with reference to the components of the exhaust system 200, it should be understood that other embodiments may include more, less, or different components. That is, other embodiments could be used without departing from the scope of this disclosure.

The inlet system is 206 disposed forward of ram air turbine RAT and the forward heat exchangers 201. The inlet system 206 includes the forward IML 201, which may be similar to the forward IML 101 of the exhaust system 100 in FIG. 1. In certain embodiments, the inlet system 206 includes the forward heat exchanger 202, which may be similar to the forward heat exchanger 102 of the exhaust system 100 in FIG. 1. In certain embodiments, the exhaust system 200 includes the forward heat exchanger 202. The inlet system 206 receives the incoming fluid stream 215, directs a first portion 216 of the incoming fluid stream 215 through the ram air turbine RAT, and directs a second portion 217 of the incoming fluid stream 215 through the forward heat exchangers 202. The fluid of the second portion 217 of the incoming fluid stream 215 exits the inlet and exhaust system as a portion 220c of the outgoing fluid stream 220.

The exhaust system 200 includes a bypass fluid duct (BFD) including an aft IML 205 and a door 210, and after heat exchangers 235, which may be similar to components 105, 110, and 135 of the exhaust system 100 in FIG. 1, respectively. The bypass fluid duct (BFD) of the exhaust system 200 also includes a fixed bypass diffuser 240 that direct a bypass flow (also referred to as a second outgoing stream 220b) of fluid to exit the BFD.

In embodiments where the exhaust system 200 includes the forward heat exchangers 202, the exhaust system 200 receives the incoming fluid stream 215, including the first and second portions 216-217. In embodiments where the inlet system 206 includes the forward heat exchangers 202, the exhaust system 200 receives the fluid of the first portion 216 of the incoming fluid stream that is pressurized and discharged from the ram air turbine RAT.

The exhaust system 200 outputs fluid as the outgoing fluid stream 220 to join an ambient fluid flow outside the pod. More particularly, the BFD of the exhaust system 200 outputs a first outgoing fluid stream 220a when the door 210 is closed. The BFD of the exhaust system 200 outputs the first outgoing fluid stream 220a and a second outgoing fluid stream 220b when the door 210 is open. When the exhaust system includes the forward heat exchangers 202, the exhaust system 200 outputs a third outgoing fluid stream 220c. The outgoing fluid stream 220 includes the first 220a, second 220b, and third 220c outgoing fluid streams.

When the door 210 is closed, the fluid of the first portion 216 of the incoming fluid stream 215 that is discharged from the ram air turbine RAT flows through a channel of the BFD between the door 210 and the aft IML 205. A first portion 218 of the fluid discharged from the ram air turbine RAT flows through the aft heat exchangers 235, and a second portion (not shown) of the fluid discharged from the ram air turbine RAT flows over the aft heat exchangers 235. The first subportion 218 and second subportion (not shown) of the fluid discharged from the ram air turbine RAT exit through an outlet of the BFD as a first outgoing fluid stream 220a.

The door 210 is opened by a mechanism that changes the door angle with respect to the exterior surface of the pod. The mechanism that changes the door angle can be a 4-bar linkage that includes a virtual pivot that moves as a function of the door position to cause the door 210 to move aftward as the door 210 rotates open. When the door 210 is open to a partially extended position or a fully extended position, a third portion (also referred to as the second outgoing fluid stream 220b) of the fluid discharged from the ram air turbine RAT flows out of the BFD of the exhaust system 200 through an opening between the fixed bypass diffuser 240 and the forward-most end of the door 210. As a result, the fluid of the second outgoing fluid stream 220b exits the BFD without flowing over the aft heat exchangers 235 and without flowing through the aft heat exchangers 235. In the example shown, the door 210 is open to a fully extended position, where the door angle is a maximum door angle.

Figure 3A:
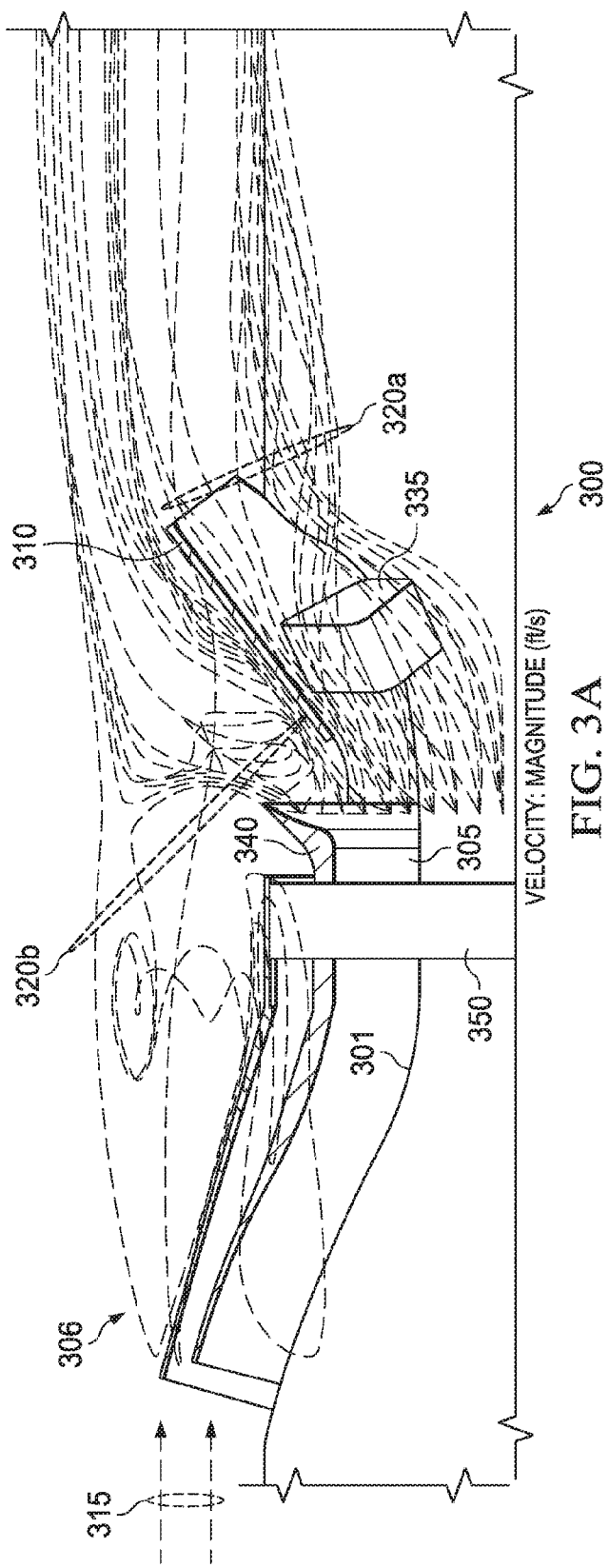
FIG. 3A illustrates a cross sectional view of an inlet and exhaust system including a fixed diffuser and a door disposed at a 38 degree door angle.

FIG. 3A illustrates a cross sectional view of an inlet and exhaust system including a fixed bypass diffuser and a door disposed at a 38 degree door angle. The inlet and exhaust system is centered about a longitudinal axis of symmetry of a pod. The inlet and exhaust system includes an inlet system 306, a ram air turbine, and exhaust system 300. The inlet and exhaust system receives an incoming fluid stream 315 and outputs a first outgoing fluid stream 320a and a second outgoing fluid stream 320b, which may be similar to the incoming fluid stream 215 and the first outgoing fluid stream 220a and the second outgoing fluid stream 220b in FIG. 2. Although certain details will be provided with reference to the components of the exhaust system 300, it should be understood that other embodiments may include more, less, or different components. That is, other embodiments could be used without departing from the scope of this disclosure.

The inlet system 306 includes a forward IML 301, which may be similar to the forward IML 201 of the inlet system 206 in FIG. 2.

The exhaust system 300 includes a bypass fluid duct (BFD) including an aft IML 305, a door 310, and a fixed bypass diffuser 340; and an aft heat exchanger 335 within a channel of the BFD, which may be similar to components 205, 210, 240, and 235 of the exhaust system 200 in FIG. 2.

The exhaust system 300 receives fluid that is pressurized and discharged from a ram air turbine (RAT) 350 within the inlet and exhaust system, which may be similar to the RAT of FIG. 2. A first portion (including three subportions) of the fluid discharged from the RAT 350 flows through the channel of the BFD, between the door 310 and the aft IML 305, and exits the BFD as the first outgoing fluid stream 320a. A first of the three subportions flows through the aft heat exchangers 335. A second subportion flows over the aft heat exchangers 335, between the top of the aft heat exchangers 335 and the interior surface of the door 310. A third subportion flows under or around the aft heat exchangers 335, between the bottom of the aft heat exchangers 335 and an exterior surface of the aft IML 305. A second portion of the fluid discharged from the RAT 350 flows through a bypass opening, between the fixed bypass diffuser 340 and the forward-most end of the door 310, and exits the BFD as the second outgoing fluid stream 320b. As a result, the fluid of the second outgoing fluid stream 320b exits the BFD without flowing over the aft heat exchangers 335 and without flowing through the aft heat exchangers 335.

In the example shown in FIG. 3A, the vessel is flying at a 35,000 feet altitude; the ambient temperature is relatively hot; the speed of the pod is 0.75 Mach (M); and the door 310 is open to a 38° angle. The environmental characteristics require the performance mode of the pod to generate power, but the recirculative motion of the air flow reduces the pod's effectiveness at generated power. More particularly, the shape of the fixed bypass diffuser is too steep and provides an ineffective flow expansion.

Figure 3B:
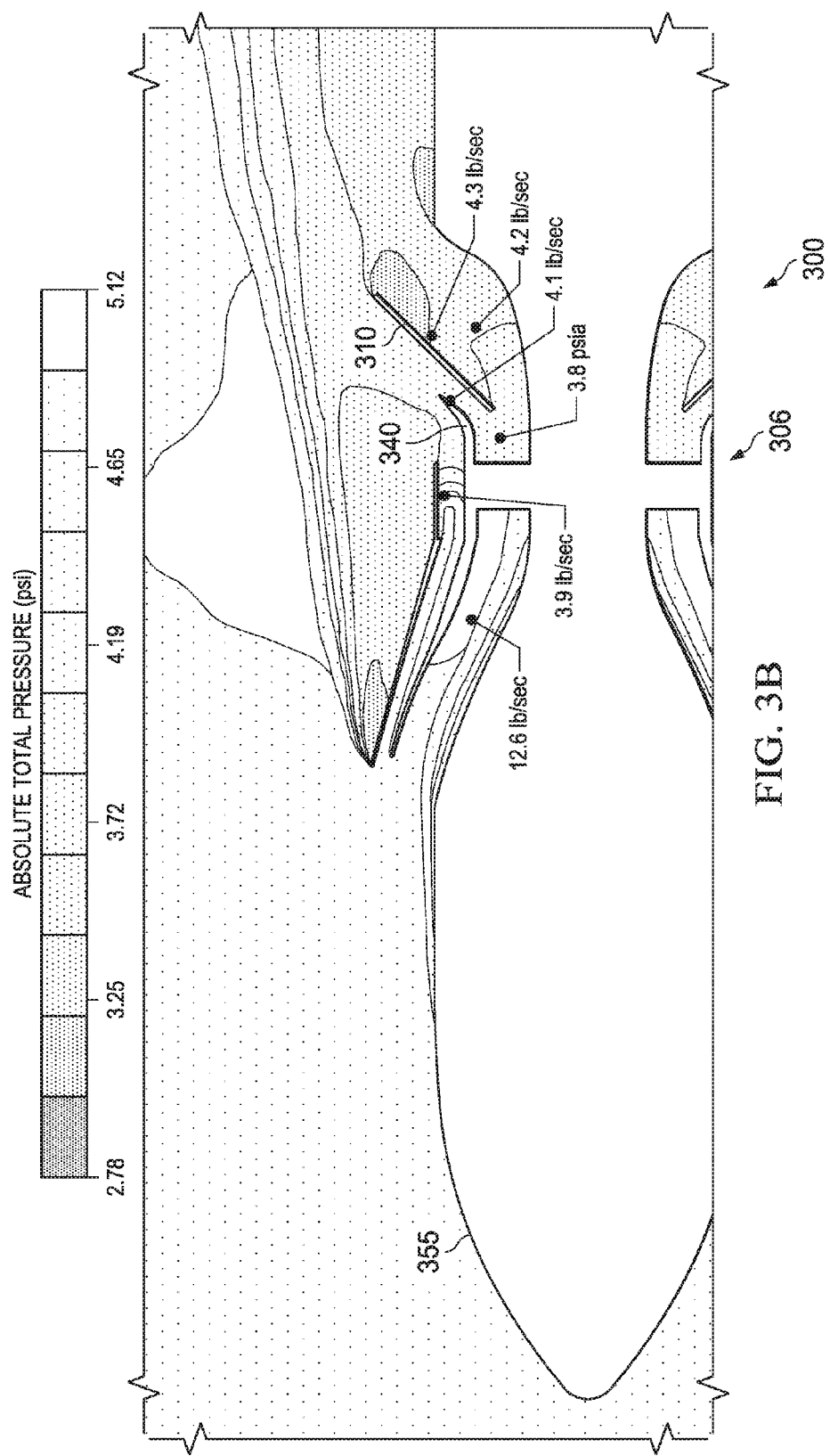
FIG. 3B illustrates measured flows of a ram air turbine (RAT) back pressure and aft heat exchanger flows of the inlet and exhaust system of FIG. 3A that are regulated by a bypass fluid duct including a door disposed at angle near a maximum door angle.

FIG. 3B illustrates measured flows of a ram air turbine (RAT) back pressure and aft heat exchanger flows that are regulated by a bypass fluid duct including a door disposed at angle near a maximum door angle. FIG. 3B shows a top view and axial cross section of a jammer pod 355 having an inlet and exhaust system that includes a plurality of doors and fixed bypass diffusers. More particularly the pod 355 includes one door and one corresponding fixed bypass diffuser on the left (shown at the bottom of the drawing) and one door and one corresponding fixed bypass diffuser on the right of the pod (shown at the top of the drawing). The inlet and exhaust system of the pod in FIG. 3B can include any of the inlet and exhaust systems of FIGS. 2 and 3A.

In the example shown in FIG. 3B, the vessel is flying at 35,000 feet altitude, and the speed of the pod is 0.75 M.

The bypass fluid duct regulates the ram air turbine back pressure and aft heat exchanger flow. The BFD opens the door 310 to a partially extended position to a door angle near the minimum door angle, causing a high aft heat exchanger flow rate and high heat rejection. The BFD opens the door 310 to a fully extended position to a door angle near the maximum door angle, causing a low RAT back pressure and high power generation. Approximately fifty percent (e.g., 49%) of the first portion of the fluid discharged from the RAT 350 flows through the aft heat exchangers 335, and the remainder (e.g., 51%) flows over or around the aft heat exchangers 335. That is, approximately half of the first outgoing fluid stream 320a is output from the aft heat exchangers 335 and the remaining half exits the BFD without flowing through the aft heat exchangers 335. In the example shown, the fluid in the first outgoing fluid stream 320a includes 8.5 pounds per second of power, where 49% the first outgoing fluid stream 320a exits the aft heat exchangers 335 with 4.2 pounds per second of power, and the remaining 51% of the first outgoing fluid stream 220a exits the BFD with 4.3 pounds per second of power.

The pod 355 includes pressure sensors that measure an absolute total pressure of the fluid within the inlet and exhaust system of the pod. The pod 355 includes power sensors that measure power of the fluid within the inlet and exhaust system of the pod 355. Table 1 describes the absolute total pressure and power of the fluid measured at various places within the inlet and exhaust system of the pod 355. Power is measured using air mass flow rate.

TABLE 1

Bypass Fluid Duct Regulates Ram Air Turbine Back Pressure and Aft Heat Exchanger Flow with a Door Angle Near a Maximum Door Angle.

| Stream Name | Absolute Total Pressure [pounds per square inch absolute] | Power [pounds per second] |
| --- | --- | --- |
| first portion (216, 316) of the incoming fluid stream | N/A | 12.6 lb/sec |
| second portion (217, 317) of the incoming fluid stream | N/A | 3.9 lb/sec |
| fluid discharged from the ram air turbine RAT | 3.8 psia | N/A |
| first outgoing fluid stream 220a | N/A | 8.5 lb/sec |
| second outgoing fluid stream 220b | N/A | 4.1 lb/sec |
| first subportion of the first portion of the fluid discharged from the RAT | N/A | 4.2 lb/sec |
| second and third subportions of the first portion of the fluid discharged from the RAT | N/A | 4.3 lb/sec |

Figure 3C:
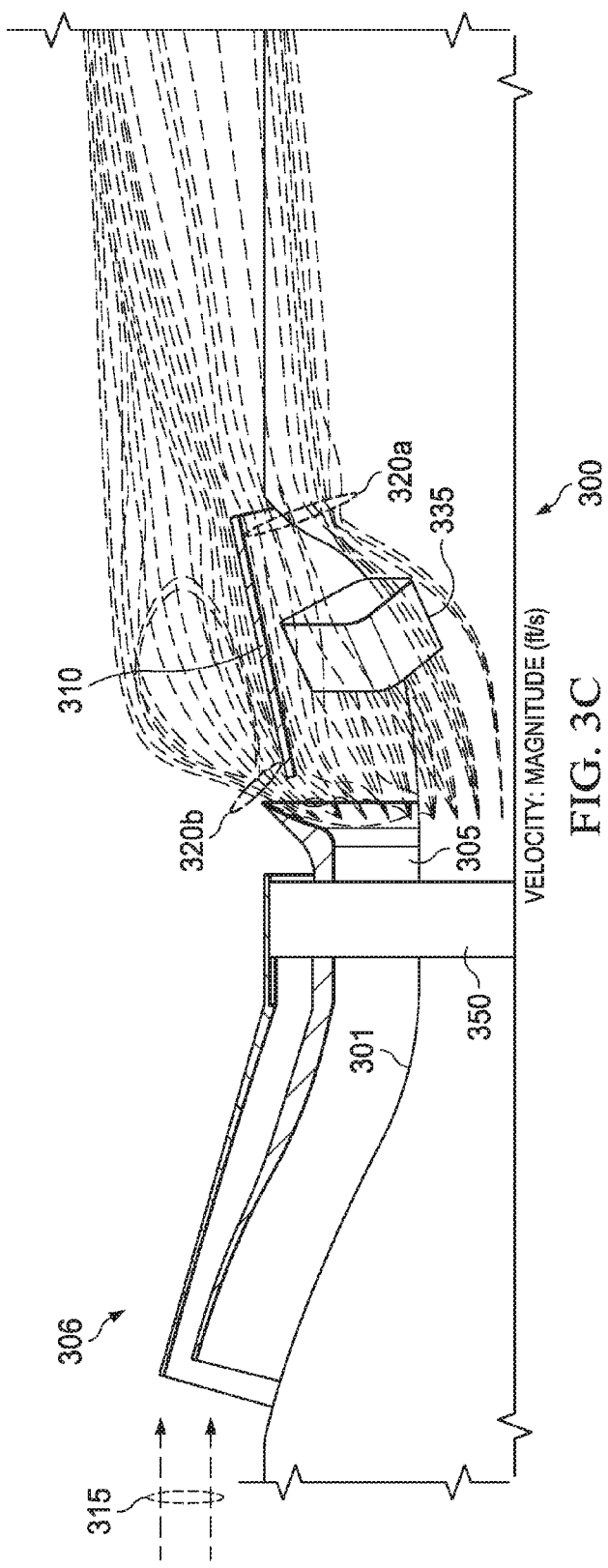
FIG. 3C illustrates a cross sectional view of the inlet and exhaust system of FIG. 3A with the door disposed at a 10.6 degree door angle.

FIG. 3C illustrates a cross sectional view of the inlet and exhaust system of FIG. 3A with the door disposed at a 10.6 degree door angle. In the example shown in FIG. 3C, the vessel is flying at a 20,000 feet altitude; the ambient temperature is relatively hot; the speed of the vessel is 0.86 M; and the door 310 is open to a 10.6° angle. The environmental characteristics requires performance mode of the pod to generate cooling, but approximately sixty percent (more specifically, 59%) of the fluid (i.e., air) does not flow through the aft heat exchangers 335. That is, the second and third subportions of the first portion of the fluid discharged from the RAT 350 account for 60% of the fluid discharged from a ram air turbine (RAT) 350. Approximately forty percent (more specifically, 41%) of the fluid discharged from the RAT 350 flows through the aft heat exchangers 335. The pod cannot utilize all of the power that the RAT generator (RAG-G) is capable of generating because the heat rejection rate is insufficient. In other words, an insufficient amount of air passes through the aft heat exchangers 335, and too much air leaks around (i.e., over or under, but not through) the heat exchangers. The primary bypass in front of the front-most portion of the door 310 allows 12% of the fluid discharged from the RAT 450 exit the pod 355 without flowing through or around the aft heat exchanger 335. That is, the second outgoing fluid stream 320b accounts for 12% of the fluid in the first portion 316 of the incoming fluid stream 315; the 52% of the fluid in the first portion 316 flows around the heat exchanger 335; and 36% enters and flows through the heat exchangers 335. The streamlines (also referred to as fluid flow lines) represent all flow exiting the turbine and flowing around the aft heat exchanger 335.

Figure 3D:
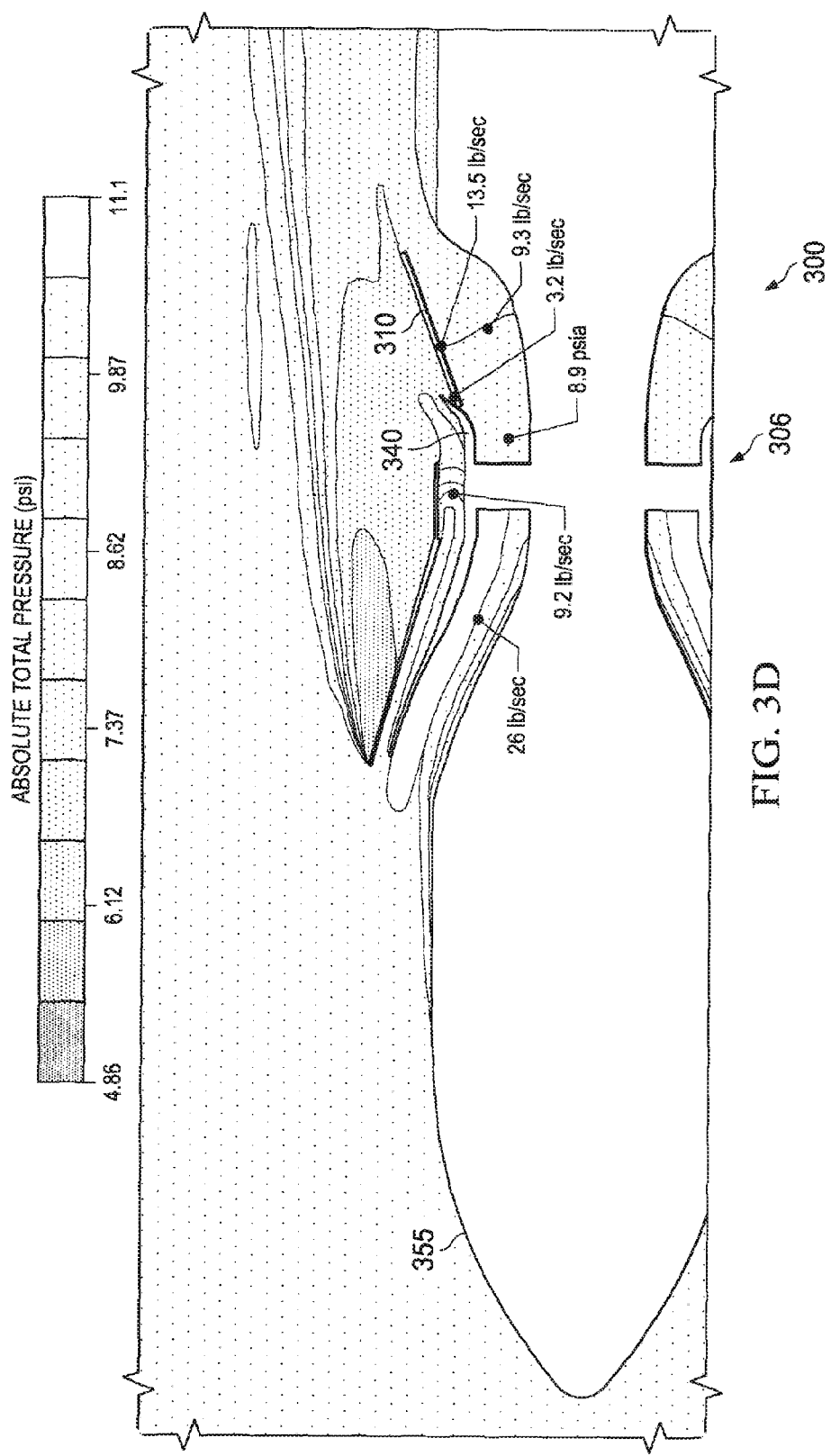
FIG. 3D illustrates measured flows of the RAT back pressure and aft heat exchanger flows that are regulated by the bypass fluid duct of FIG. 3B with the door disposed at an angle near a minimum door angle.

FIG. 3D illustrates measured flows of the RAT back pressure and aft heat exchanger flows that are regulated by the bypass fluid duct of FIG. 3B with the door disposed at an angle near a minimum door angle. In the example shown in FIG. 3D, the vessel is flying at 20,000 feet altitude, and the speed of the pod is 0.86 M. In the example shown, the fluid in the first outgoing fluid stream 320a includes 22.8 pounds per second of power, where 41% of the first outgoing fluid stream 320a exits the aft heat exchangers 335 with 9.3 pounds per second of power, and the remaining 59% of the first outgoing fluid stream 320a exits the BFD with 13.5 pounds per second of power.

Table 2 describes the absolute total pressure and power of the fluid measured at various places within the inlet and exhaust system of the pod 355. Power is measured using air mass flow rate.

TABLE 2

Bypass Fluid Duct Regulates Ram Air Turbine Back Pressure and Aft Heat Exchanger Flow with a Door Angle Near A Minimum Door Angle.

| Stream Name | Absolute Total Pressure [pounds per square inch absolute] | Power [pounds per second] |
| --- | --- | --- |
| first portion (216, 316) of the incoming fluid stream | N/A | 26 lb/sec |
| second portion (217, 317) of the incoming fluid stream | N/A | 9.2 lb/sec |
| fluid discharged from the ram air turbine RAT | 8.9 psia | N/A |
| first outgoing fluid stream 220a | N/A | 3.2 lb/sec |
| second outgoing fluid stream 220b | N/A | 22.8 lb/sec |
| first subportion of the first portion of the fluid discharged from the RAT | N/A | 13.5 lb/sec |
| second and third subportions of the first portion of the fluid discharged from the RAT | N/A | 9.3 lb/sec |

Figure 4A:
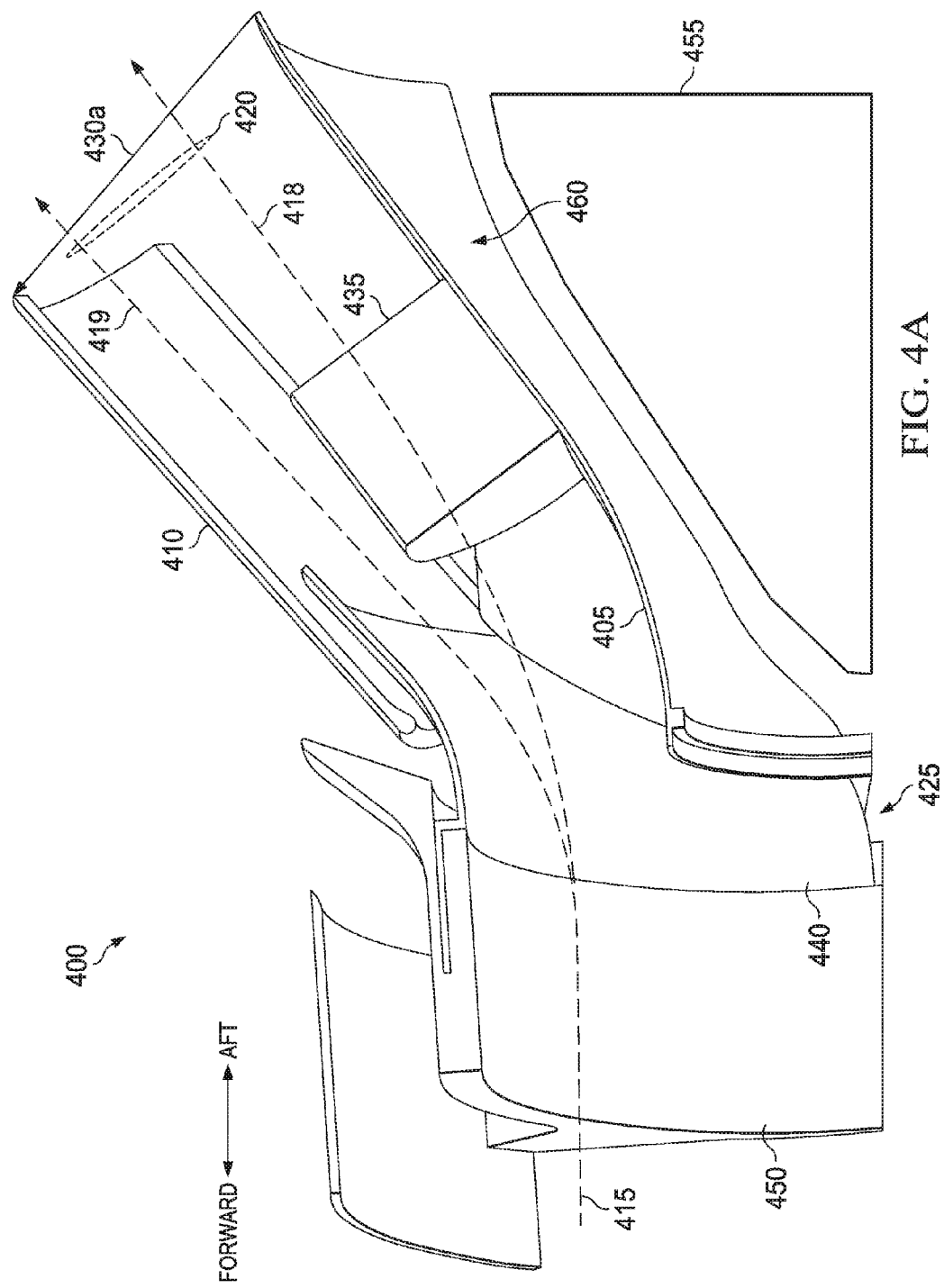
FIG. 4A illustrates a cross sectional view of an exhaust system including an articulated diffuser and door for submerged ram air turbine power and cooling control with the door in an extended position according to embodiments of the present disclosure.
Figure 4B:
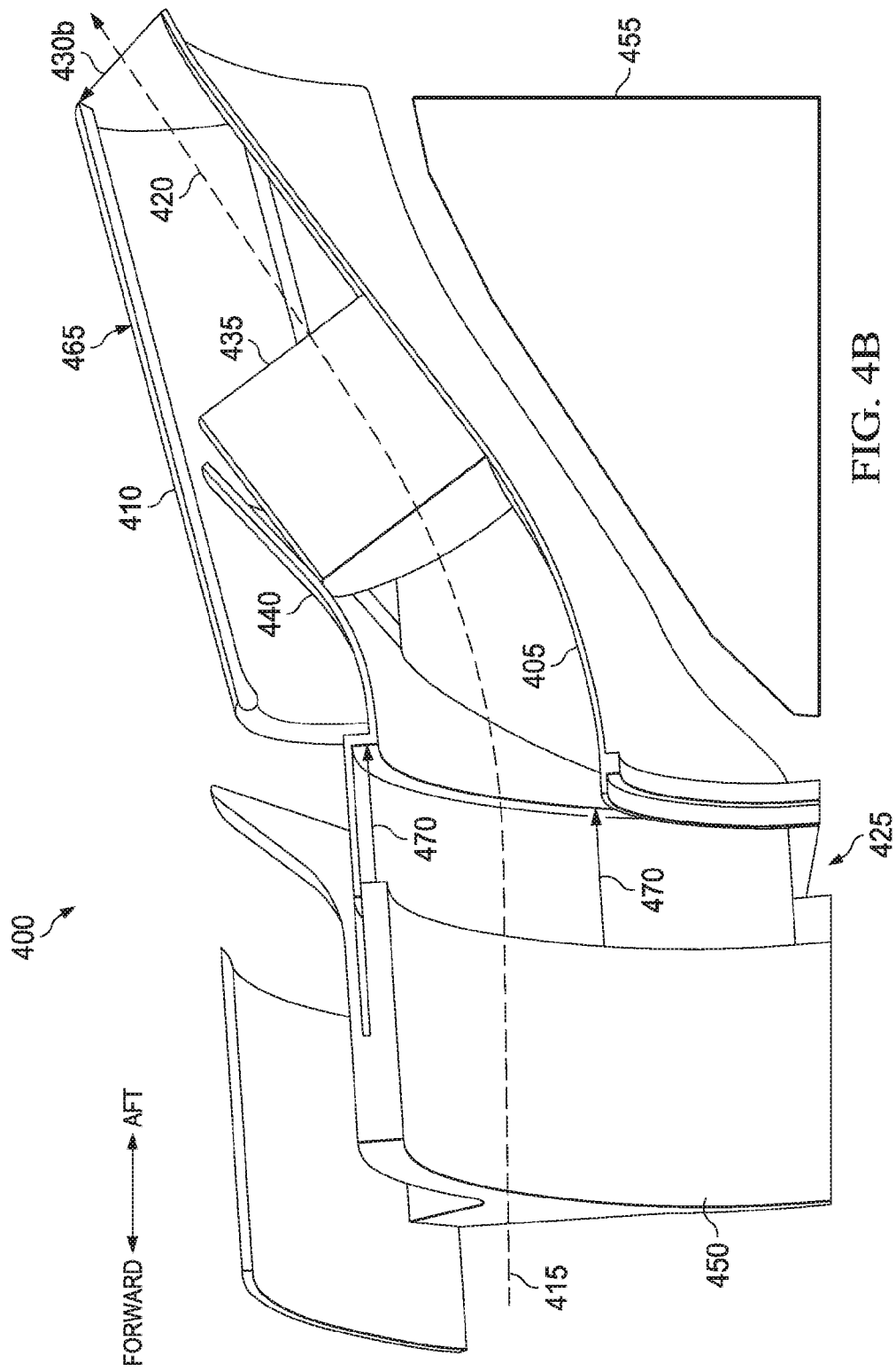
FIG. 4B illustrates a cross sectional view of the exhaust system including an articulated diffuser and door for submerged ram air turbine power and cooling control of FIG. 4A with the door in a unextended position.

FIG. 4A illustrates a three dimensional cross sectional view of an exhaust system including an articulated diffuser and door for submerged ram air turbine power and cooling control with the door in an extended position according to embodiments of the present disclosure. FIG. 4B illustrates a three dimensional cross sectional view of the exhaust system including an articulated diffuser and door for submerged ram air turbine power and cooling control of FIG. 4A with the door in a unextended position. Although certain details will be provided with reference to the components of the exhaust system 400, it should be understood that other embodiments may include more, less, or different components. That is, other embodiments could be used without departing from the scope of this disclosure.

The exhaust system 400 includes a bypass fluid duct (BFD) including an aft IML 405, a door 410, and an articulated diffuser 440; a turbine 450; a turbine generator 455; and an aft heat exchanger 435. The exhaust system 400 is composed of solid rigid structures that maintain shape during movement between extended and unextended positions.

The exhaust system 400 receives an incoming fluid stream 415 from the turbine 450 and outputs the fluid as an outgoing fluid stream 420 to join an ambient fluid flow. For example, the incoming fluid stream 415 can be exhaust, pressurized by and discharged from a ram air turbine (RAT) within a vessel, such as an airplane or pod. The exhaust system 400 reduces the pressure of the fluid such that the outgoing fluid stream 420 has a lower pressure than the incoming fluid stream 415.

The aft IML 405 encloses the turbine generator 455, a turbine pump, cables, and an actuator. That is, an interior surface 460 of the aft IML 505 surrounds the turbine generator 455, turbine pump, cables, and the actuator. The aft IML 405 includes an oval shaped lateral cross-section and a truncated conically shaped axial cross-section. The aft IML 405 prevents fluid of the incoming fluid stream 415 from entering an interior of the aft IML 105, where the turbine generator 455 is located. That is, the aft IML 405 allows the fluid of the incoming fluid stream 415 to flow only across the outer surface of the aft IML 405.

The exhaust system 400 includes at least one bypass fluid duct that receives the incoming fluid stream 415 through an inlet 425 of the BFD, bypasses the fluid along the external surface of the aft IML 405 and around the turbine generator 455, and directs the flow path (shown as a dotted line, split) of the fluid from the inlet 425 through an outlet (represented by an arrow 430a, 430b) of the BFD to join the ambient fluid flow. The bypass fluid duct includes a channel that extends from the inlet 425 to the outlet 430a, 430b. For example, the channel can be ring shaped, where the aft IML 405 forms the inner boundary of the ring, and where an outer exit shroud of the BFD forms the outer boundary of the ring. In this example, the flow path of the fluid of the incoming fluid stream 415 is directed through the volume of channel between the inner and outer boundaries of the ring shaped channel (i.e., between the exterior surface of the aft IML 405 and interior surface of the outer exit shroud. The articulated diffuser 440 and the door 110 together form the outer shroud of the BFD. The bypass fluid duct regulates the turbine back pressure and aft heat exchanger flow by varying the shape, the volume, and the flow path of the fluid in the channel. More particularly, the shape, the volume, and the flow path of the fluid in the channel change corresponding to a movement of the outer exit shroud (i.e., the articulated diffuser 440 and the door 110) to various positions, including an unextended position (for example, a retracted position), a fully extended position, and a partially extended position between the unextended and fully extended positions. In the unextended position, the door 410 is pivoted to the minimum door angle, and the articulated diffuser 440 is located in the forward location. In the fully extended position, the door 410 is pivoted to the maximum door angle, and the articulated diffuser 440 is located in the aft location. In the partially extended positions, the door 410 is pivoted to a door angle between the minimum door angle and the maximum door angle, and the articulated diffuser 440 is located between the forward and aft locations.

The exhaust system 400 includes one or more doors 410. In certain embodiments, the exhaust system 400 includes two doors 410—one door 410 on each of the left and right sides of the BFD. The shape of the door 410 is arced corresponding to the round shape of the exhaust system 400. In operation, the door 410 opens and closes to meet the performance needs of the turbine 450 and turbine generator 455 within the vessel. When the door 410 is closed, the exterior surface of the door 410 is flush with the exterior surface of the pod. Also, when the door 410 is closed, the door 410 is disposed in an unextended position, where the angle of the door 410, with reference to the exterior surface of the pod, is a minimum door angle. In the example shown in FIG. 4B, the door 410 is closed at the door angle 0°. A single actuator mechanism (described below with reference to FIG. 5) opens the door 410 by driving, such as by extending, the aft end of the door 410 outward, away from the center line of the pod. The single actuator mechanism drives the door closed by pivoting or rotating the door 410 toward the center line of the pod. In certain embodiments, the door 410 is a single pivot door.

When the door 410 is open, the door 410 is not flush with the exterior surface of the pod. Also, when the door 410 is open, the door 410 is disposed in either a partially extended position or a fully extended position. In the fully extended position, the angle of the door 410, with reference to the exterior surface of the pod, is a maximum door angle. In certain embodiments, the maximum door angle is 38°. The maximum door angle is less than 90°. In a partially extended position, the angle of the door 410, with reference to the exterior surface of the pod, is between the minimum door angle and the maximum door angle. In the example shown in FIG. 4A, the door 410 is open.

The distance from the exterior surface of the aft-most end of the aft IML 405 to the interior surface of the aft-most end of the door 410 represented by the arrow 430a, 430b. The distance 430a, when the door 410 is open, is greater than the distance 430, when the door is closed. The cross sectional area of the outlet 430a, 430b of the BFD enlarges and reduces corresponding to the distance between the aft IML 405 and the door 410. A movement of the door 410 and the articulated diffuser 440 from the unextended position to the partially extended position enlarges a cross sectional area of the outlet. A movement of the door 410 and the articulated diffuser 440 from the fully extended position to the partially extended position reduces the cross sectional area of the outlet 430a, 430b.

The exhaust system 400 includes one or more articulated diffuser 440. Each articulated diffuser 440 corresponds to a one of the doors 410. The articulated diffuser 440 moves from a forward location to an aft location. The single actuator mechanism (described below with reference to FIG. 5) linearly translates the articulated diffuser 440 between the forward and the aft locations. When the outer exit shroud is disposed in an unextended position, the articulated diffuser 440 is located in the aft location (shown in FIG. 4B). When the outer exit shroud is disposed in the fully extended position, the articulated diffuser 440 is located in the forward location (shown in FIG. 4A). The arrows 470 represent the distance and direction of linear translation of the articulated diffuser 440 from the forward location to the aft location. In certain embodiments, the articulated diffuser 440 moves in a horizontal only direction.

The articulated diffuser 440 extends from the turbine 450 to the door 410, extending forward of the aft-most end of the turbine 450, and extended aft of the forward-most end of the door 410. As a result, the articulated diffuser 440 prevents fluid of the incoming fluid stream 415 from bypassing the channel within the BFD. The articulated diffuser 440 is traversely coupled to the aftward portion of the turbine 450, such that a portion of the articulated diffuser 440 is disposed within turbine 450 (e.g., in a slot). While traversing forward/aftward, the articulated diffuser 440 slides within the slot. Whether the articulated diffuser 440 is in the forward or aft position, the diffuser's length allows the diffuser to block an opening between the turbine 450 and the forward-most end of the door 410. The shape of the articulated diffuser 440 includes a smooth, curved incline that directs the fluid discharged from the turbine 450 along a non-turbulent flow path through the channel of the BFD. The shape of the forward-most end of the articulated diffuser 440 narrows the inlet 425 of the BFD when disposed in the aft location, yet is flush with the aftward portion of the turbine 450 when disposed in the forward position. When disposed in the forward location, the shape of the aftward portion of the articulated diffuser 440 is flush with the forward portion of the interior surface of the door 410. When disposed in the aft location, the shape of the aftward portion of the articulated diffuser 440 narrows height of the channel to the approximate height of the aft heat exchanger 435 within the channel. As a result, a fluid generally does not leak around the aft heat exchanger 435, and does not flow over or under the aft heat exchanger 435. Computational Fluid Dynamic analysis shows that greater than ninety-five percent (>95%) of the air flow can be directed through the aft heat exchanger 435, compared to the approximately forty percent (40%) of the fluid (i.e., air) that flows through the aft heat exchangers 135, 335 in the example of FIGS. 1 and 3C-3D. At most five percent (5%) of the fluid discharged from the turbine 450 flows over or around the aft heat exchanger 435. The aftward portion (including the aft-most-end) of the articulated diffuser 440 is disposed under the door 410. In comparison, the bypass diffusers 240, 340 of the exhaust systems shown in FIGS. 2, 3, and 4 are disposed above the door 210, 310.

The exhaust system 400 includes one or more aft heat exchangers 435 based on volume allocation. The aft heat exchangers 435 receive heat (by thermal conduction) from the liquid cooling system generator 455 enclosed within the aft IML 405 and reject (by thermal convection) the received heat into the outgoing fluid stream 420. The aft heat exchangers 435 are coupled to the exterior surface of the aft IML 405. That is, the aft heat exchangers 435 are disposed within the channel of the BFD. The flow path of the fluid of the incoming fluid stream 415 is directed through the aft heat exchangers 135. When the door 410 is open, a first portion 418 of the fluid of the incoming fluid stream 415 flows through the aft heat exchangers 435, and a second portion 419 of the fluid of the incoming fluid stream 415 flows over the aft heat exchangers 135.

The turbine 450 can include a ram air turbine. The turbine generator 455 can include a ram air turbine generator.

FIG. 4C illustrates a cross sectional view of an inlet and exhaust system including an articulated diffuser and a door for submerged ram air turbine power and cooling control with the door disposed at a 38 degree door angle. The inlet and exhaust system is centered about a longitudinal axis of symmetry of a pod. The inlet and exhaust system includes an inlet system 406, a ram air turbine 450, and exhaust system 400. The exhaust system receives an incoming fluid stream 415 from the ram air turbine 450 and outputs an outgoing fluid stream 420. Although certain details will be provided with reference to the components of the exhaust system 400, it should be understood that other embodiments may include more, less, or different components. That is, other embodiments could be used without departing from the scope of this disclosure.

The inlet system 406 includes a forward IML 401, which may be similar to the forward IML 201 or 301 of the inlet systems 206 in FIGS. 2 and 306 in FIG. 3A. In FIG. 4C, the inlet system 406 is coupled to the exhaust system 400 of FIG. 4A through the ram air turbine 450. The inlet system 406 receives an incoming fluid stream, which divides into a first portion 416 that flows into the ram air turbine 450 and a second portion 417 that flows into a forward heat exchanger. The second portion 417 of the fluid that enters the inlet system 406 does not enter the exhaust system 400, yet rejoins an ambient air flow upon exiting the front heat exchanger.

The exhaust system 400 receives the incoming fluid stream 415 from the turbine 450 and outputs the fluid as an outgoing fluid stream 420 to join an ambient fluid flow. The fluid flow lines are shown in FIG. 4C for an example in which the articulated diffuser 440 and door 410 are in a partially extended position near a fully extended position, in which the door 410 is pivoted to a door angle near the maximum door angle. In this example, the outgoing fluid stream 420 includes 14.8 pounds per second of power, where 32% of the outgoing fluid stream 420 exits the aft heat exchangers 435 with 4.7 pounds per second of power, and the remaining 68% of the outgoing fluid stream 420 exits the BFD with 10.1 pounds per second of power. Unlike the second outgoing fluid stream 320b in the embodiments in FIGS. 1-3D, none of the fluid discharged from the ram air turbine 450 bypasses the BFD by exiting between front-most end of the door 410 and the articulated diffuser. Accordingly, the first portion 418 of the fluid of the incoming fluid stream 415 includes 32 percent of the incoming fluid stream 415 because all of the incoming fluid stream 415 exits the BFD.

Figure 4D:
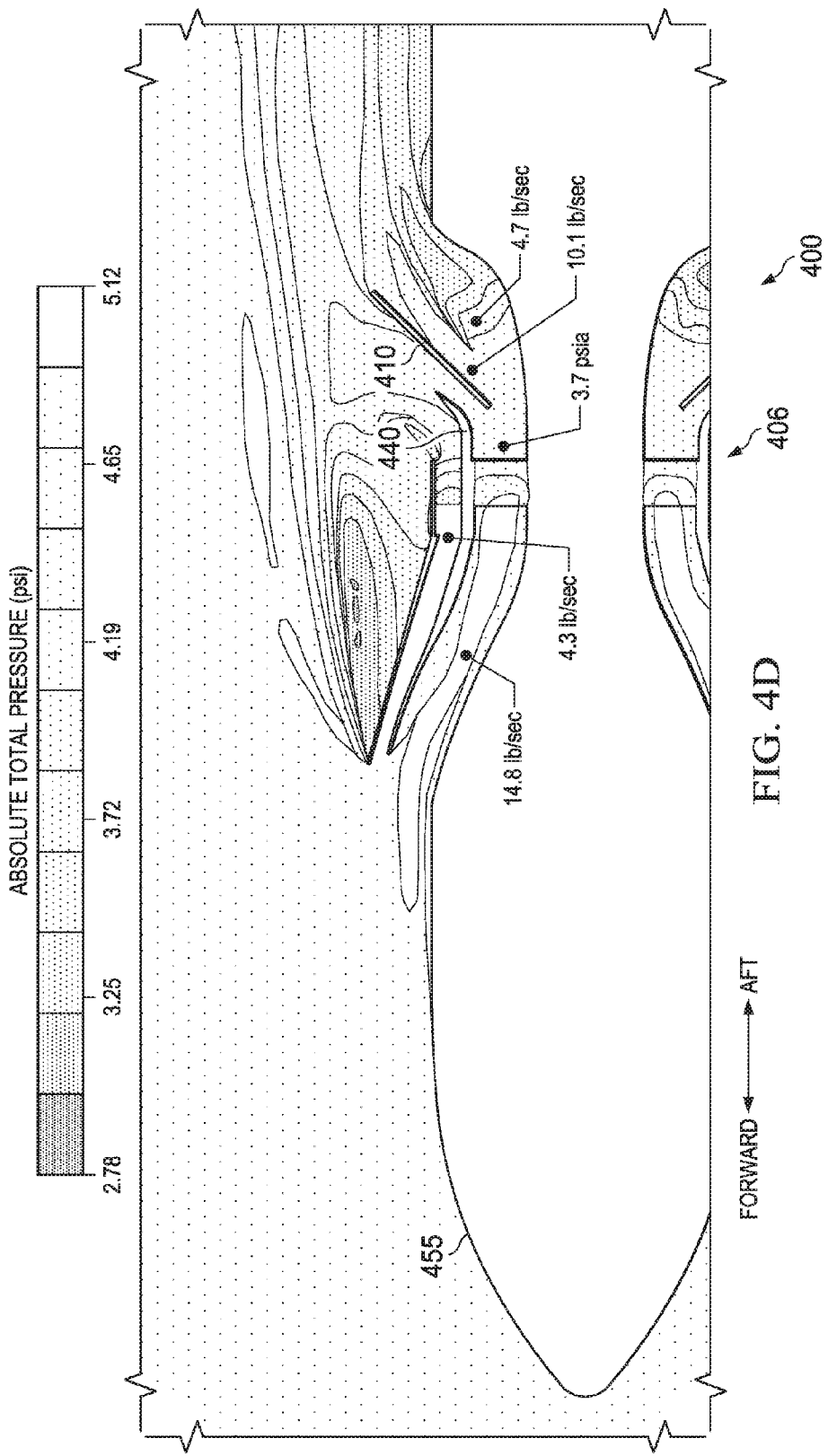
FIG. 4D illustrates measured flows of a ram air turbine (RAT) back pressure and aft heat exchanger flows of the inlet and exhaust system of FIG. 4C that are regulated by a bypass fluid duct including a door disposed at angle near a maximum door angle.

FIG. 4D illustrates measured flows of a ram air turbine (RAT) back pressure and aft heat exchanger flows of the inlet and exhaust system of FIG. 4C that are regulated by a bypass fluid duct including a door disposed at angle near a maximum door angle. The streamlines represent the fluid flow exiting the turbine 450 and flowing around the aft heat exchanger 435. In the example shown in FIG. 4D, the vessel is flying at 35,000 feet altitude, and the speed of the pod is 0.75 M. The BFD opens the door 410 to an extended position to a door angle near the maximum door angle, causing a low RAT back pressure and high power generation. Approximately sixty-eight percent (68%) of the first portion of the fluid discharged from the RAT 450 flows through the aft heat exchangers 435, and the remainder (32%) flows over or around the aft heat exchangers 435. That is, approximately one-third of the outgoing fluid stream 420 is output from the aft heat exchangers 435 and the remaining two-thirds exits the BFD by flowing around the aft heat exchangers 435. In the example shown, the fluid in the outgoing fluid stream 420 includes 14.8 pounds per second of power, where 68% the outgoing fluid stream 420 exits the aft heat exchangers 435 with 4.7 pounds per second of power, and the remaining 68% of the outgoing fluid stream 420 exits the BFD with 10.1 pounds per second of power.

The pod 455 includes pressure sensors that measure an absolute total pressure of the fluid within the inlet and exhaust system of the pod. The pod 455 includes power sensors that measure power of the fluid within the inlet and exhaust system of the pod 455. Table 3 describes the absolute total pressure and power of the fluid measured at various places within the inlet and exhaust system of the pod 455. Power is measured using air mass flow rate.

TABLE 3

Bypass Fluid Duct Regulates Ram Air Turbine Back Pressure and Aft Heat Exchanger Flow with a Door Angle Near a Maximum Door Angle.

| Stream Name | Absolute Total Pressure [pounds per square inch absolute] | Power [pounds per second] |
| --- | --- | --- |
| first portion (416) of the incoming fluid stream | N/A | 14.8 lb/sec |
| second portion (417) of the incoming fluid stream | N/A | 4.3 lb/sec |
| fluid discharged from the ram air turbine RAT | 3.7 psia | N/A |
| first portion (418) of the fluid discharged from the turbine 450 | N/A | 4.7 lb/sec |

TABLE 3-continued

Bypass Fluid Duct Regulates Ram Air Turbine Back Pressure and Aft Heat Exchanger Flow with a Door Angle Near a Maximum Door Angle.

| Stream Name | Absolute Total Pressure [pounds per square inch absolute] | Power [pounds per second] |
| --- | --- | --- |
| second portion (419) of the fluid discharged from the turbine 450 | N/A | 10.1 lb/sec |
| outgoing fluid stream (420) | N/A | 14.8 lb/sec |

Figure 4E:
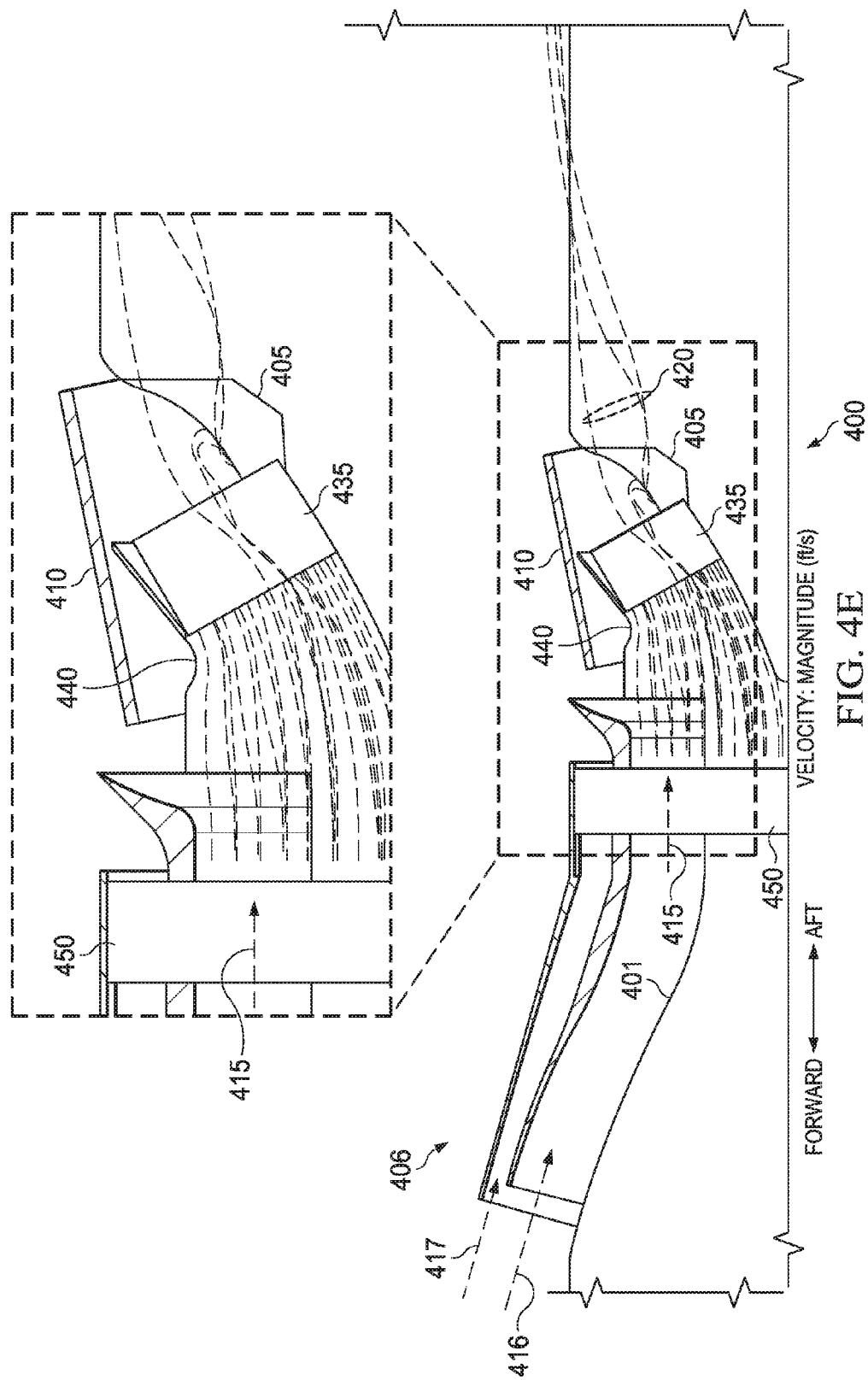
FIG. 4E illustrates a cross sectional view of an inlet and exhaust system including an articulated diffuser and a door for submerged ram air turbine power and cooling control with the door disposed at a 10.6 degree door angle.

FIG. 4E illustrates a cross sectional view of an inlet and exhaust system including an articulated diffuser and a door for submerged ram air turbine power and cooling control with the door disposed at a 10.6 degree door angle. In the example shown in FIG. 4E, the vessel is flying at a 20,000 feet altitude; the ambient temperature is relatively hot; and the speed of the vessel is 0.86 M. The environmental characteristics requires performance mode of the pod to generate cooling. To meet the cooling requirements, the exhaust system 400 enters a performance mode in which substantially ninety-five percent (95%) of the fluid (i.e., air) in the incoming fluid stream 415 flows into and through the aft heat exchangers 435. That is, the first portion of the fluid discharged from the RAT 350 accounts for substantially 95% of the fluid discharged from the ram air turbine (RAT) 450. Approximately 5 percent (5%) of the fluid discharged from the RAT 450 flows around or over the aft heat exchangers 435. The pod 455 can utilize a substantially increased amount of the power that the RAT generator (RAG-G) is capable of generating because the heat rejection rate is significantly increased. In other words, a sufficient amount of air passes through the aft heat exchangers 435, and very little air leaks around (i.e., over or under, but not through) the heat exchangers 435.

In the rectangular cut out of FIG. 4E, the articulated diffuser 440 in the extended position is shown in greater detail. A cavity is visible above the extended articulated diffuser 440 and below the door 410. This cavity does not include fluid flow lines, which illustrates that the air exiting the ram air turbine 450 flows beneath the extended articulated diffuser 440, which is beneath the door 410, and the air does not escape the BFD thru a primary bypass.

Figure 4F:
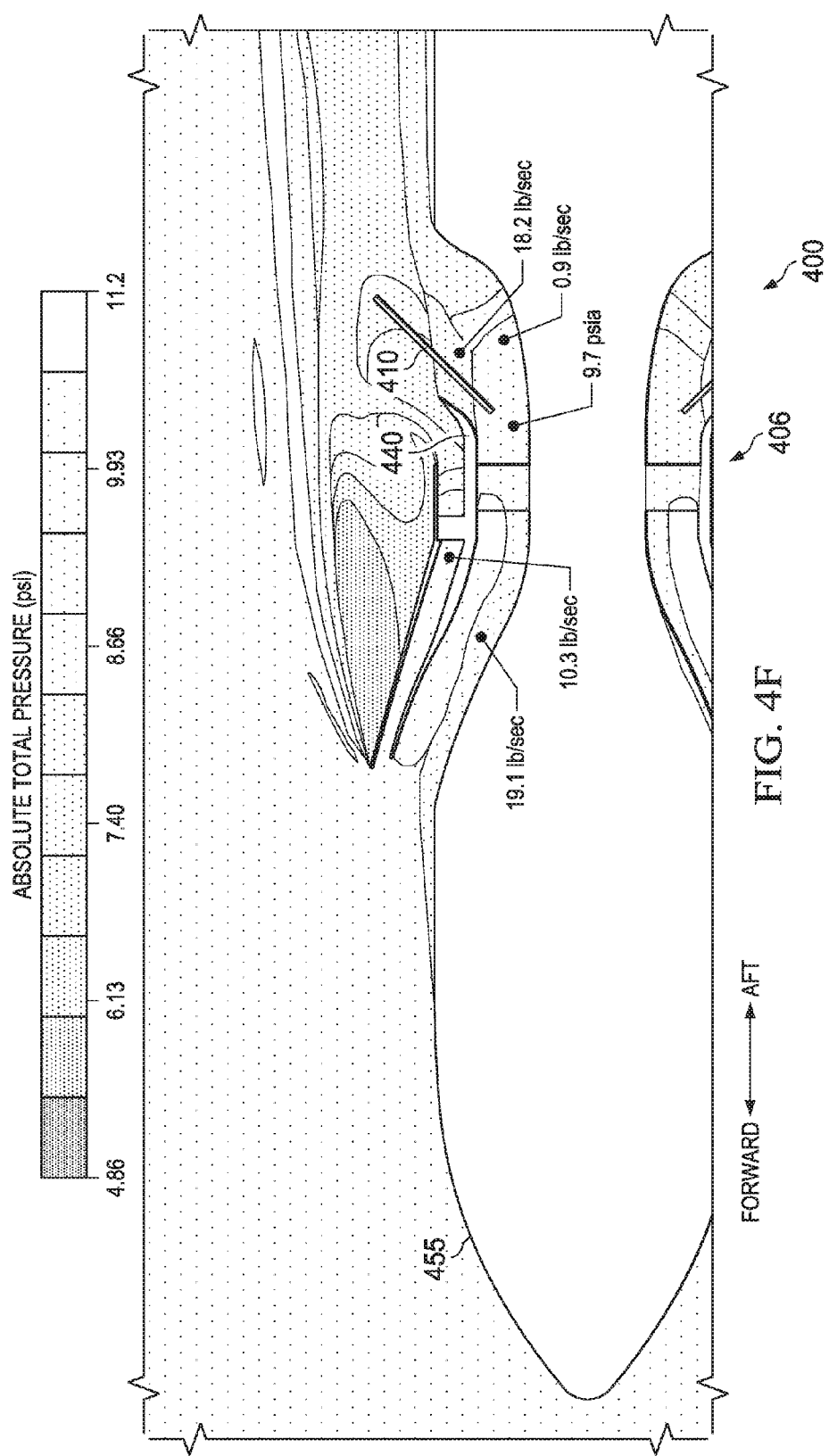
FIG. 4F illustrates measured flows of the RAT back pressure and aft heat exchanger flows that are regulated by the bypass fluid duct of FIG. 4E with the door disposed at an angle near a minimum door angle.

FIG. 4F illustrates measured flows of the RAT back pressure and aft heat exchanger flows that are regulated by the bypass fluid duct of FIG. 4E with the door disposed at an angle near a minimum door angle of 10.6 degrees (approximately 11 degrees).

Table 4 describes the absolute total pressure and power of the fluid measured at various places within the inlet and exhaust system of the pod 455. Power is measured using air mass flow rate.

TABLE 4

Bypass Fluid Duct Regulates Ram Air Turbine Back Pressure and Aft Heat Exchanger Flow with a Door Angle Near a Minimum Door Angle.

| Stream Name | Absolute Total Pressure [pounds per square inch absolute] | Power [pounds per second] |
| --- | --- | --- |
| first portion (416) of the incoming fluid stream | N/A | 19.1 lb/sec |
| second portion (417) of the incoming fluid stream | N/A | 10.3 lb/sec |

TABLE 4-continued

Bypass Fluid Duct Regulates Ram Air Turbine Back Pressure and Aft Heat Exchanger Flow with a Door Angle Near a Minimum Door Angle.

| Stream Name | Absolute Total Pressure [pounds per square inch absolute] | Power [pounds per second] |
|---|---|---|
| fluid discharged from the ram air turbine RAT | 9.7 psia | N/A |
| first portion (418) of the fluid discharged from the turbine 450 | N/A | 18.2 lb/sec |
| second portion (419) of the fluid discharged from the turbine 450 | N/A | 0.9 lb/sec |
| outgoing fluid stream (420) | N/A | 20.1 lb/sec |

Figure 5:
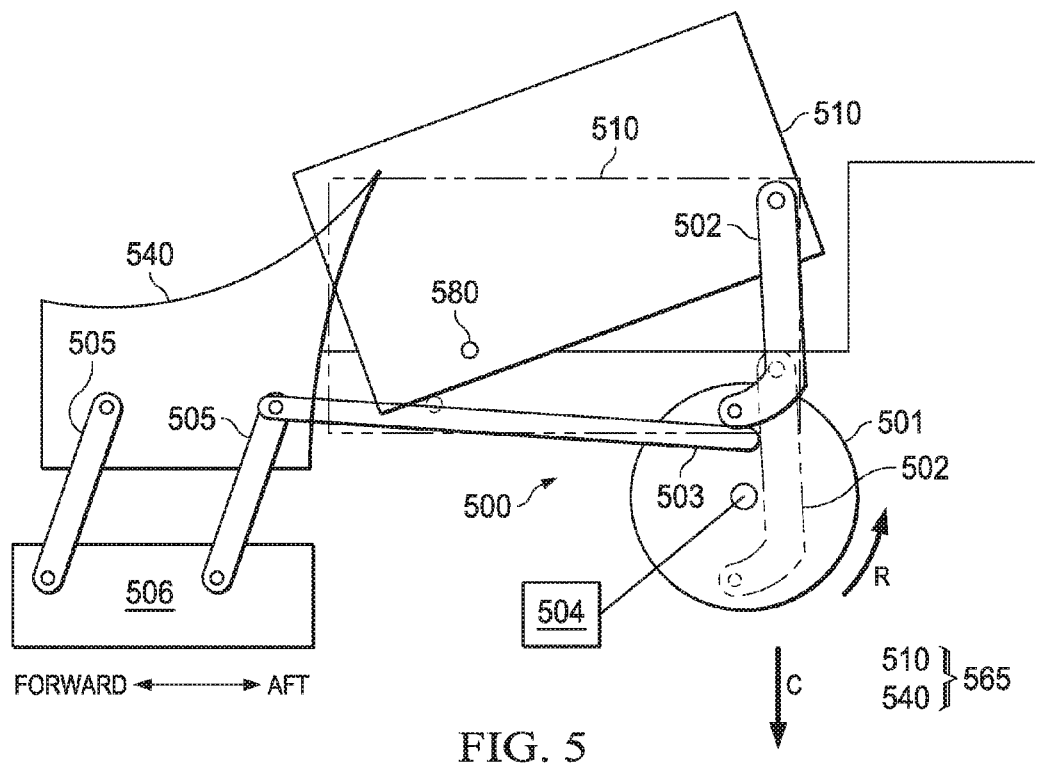
FIG. 5 illustrates an actuator mechanism that controls the positions of both the articulated diffuser and the door for submerged ram air turbine power and cooling control according to embodiments of the present disclosure.

FIG. 5 illustrates a single actuator mechanism that controls the positions of both an articulated diffuser and a door of a submerged ram air turbine power and cooling control of FIGS. 5A-5B, according to embodiments of the present disclosure. The actuator 500 is configured to control a plurality of doors (e.g., left and right) and a plurality of articulating diffusers (e.g., left and right corresponding to each door) of a bypass fluid duct (BFD). Although certain details will be provided with reference to the components of the actuator 500, it should be understood that other embodiments may include more, less, or different components. That is, other embodiments could be used without departing from the scope of this disclosure.

The actuator 500 is disposed within an exhaust system of a jammer pod. The actuator 500 is configured to move a single pivot door 510 and an articulated diffuser 540 of a bypass fluid duct at the same time.

The bypass fluid duct can be the BFD of FIGS. 4A and 4B, or the like. The BFD includes an outer exit shroud 575 and an inner mold line (IML) (not shown) forming a channel from an inlet of the bypass fluid duct to an outlet of the bypass fluid duct. The articulated diffuser 540 moves from a forward location to an aft location. The single pivot door 510 pivots from a minimum door angle to a maximum door angle about a fixed door pivot 580. The fixed door pivot 580 pivotally fixes the door 410 to the pod 455 primary structure. Accordingly, the aftward/forward position of the door 410 is fixed relative to the pod 445 primary structure.

The actuator 500 includes a rotating platform 501 pivotally coupled to a door link 502 and to a diffuser link 503; and a driver 504 coupled to the rotating platform 501. The rotating platform 501 includes a disc coupled to a shaft. For example, the rotating platform 501 is coupled to a rotating shaft of the driver 504.

The actuator 500 pivots the door 510 between the closed and fully extended positions by rotating the point where the door link 502 couples to the rotating platform. The door link 502 is coupled to the single pivot door 510. The door link 502 includes a curved bar link, or another type of suitable link. The door link 502 is represented by solid lines in the open position (i.e., partially or fully extended position) and is represented by dashed links in the closed position (i.e., unextended position). When the door link 502 is disposed at a highest point on the rotating platform 501, centered above the center of the rotating platform, then the door 510 is fully extended. When the door link 502 is disposed at a lowest point, centered below the center of the rotating platform, then the door 510 is fully retracted and closed.

The actuator 500 linearly translates the articulated diffuser 540 between the forward and the aft locations by rotating the point where the diffuser link 503 couples to the rotating platform. The diffuser link 503 is coupled to the articulating diffuser 540 and to a 4-bar diffuser linkage 505 at the same connection point. The diffuser link 503 can include a straight bar link, or another type of suitable link. When the diffuser link 503 is disposed at as far aft as possible on the rotating platform 501 (for example, aftward of the center of the rotating platform), then the diffuser 540 is fully extended to the aft position. When the diffuser link 503 is disposed at as far forward as possible on the rotating platform 501 (for example, forward of the center of the rotating platform), then the diffuser 540 is unextended to the forward position.

The driver 504 rotates the rotating platform 501. In certain embodiments, the driver 504 is a motor, and the shaft of the motor is coupled to the rotating platform. The driver 504 drives the single pivot door 510 and the articulated diffuser 540 to each of a plurality of positions, by a single rotational motion of the rotating platform 501. The plurality of positions include: an unextended position, a fully extended position, and a partially extended position between the unextended and fully extended positions. The driver 504 rotates the rotating platform 501 in a first rotational direction (in the direction of the arrow R) to move the single pivot door 510 and the articulated diffuser 540 from an unextended position to the partially extended position. The driver 504 further rotates the rotating platform 501 in the first rotational direction (in the direction of the arrow R) to move the single pivot door 510 and the articulated diffuser 540 from the partially extended position to the fully extended position (represented by solid lines).

In certain embodiments, the driver 504 includes processing circuitry configured to control the movements of the driver, and consequently control movements of the diffuser 540 and door 510 caused by the actuator 500. The processing circuitry includes executable instructions stored in a machine-usable, computer-usable, or computer-readable medium in any of a variety of forms, wherein the instructions cause the processing circuitry to perform a process of controlling operations for the articulated diffuser and door for submerged ram air turbine power and cooling control.

The 4-bar diffuser linkage 505 includes two links, such as straight bar links. Each link includes two connection points. One of the connection points of each link couples to the diffuser 540, and the other connection point couples to a fixed structure 507.

The actuator 500 opens the single pivot door 510 by extending the aft end of the door 510 outward, away from the center line of the pod. The actuator 500 drives the door 510 open by pivoting or rotating the door 510 in the first rotational direction (in the direction of the arrow R). The actuator 500 closes the door 510 by retracting the aft end of the door 510 inward (in the direction of the arrow C), toward the center line of the pod. The actuator 500 drives the door 510 closed by pivoting or rotating the door 510 in an opposite direction of the first rotational direction. The single pivot door 510 is represented by solid lines in the open position (i.e., partially or fully extended position) and is represented by dashed links in the closed position (i.e., unextended position).

Figure 6:
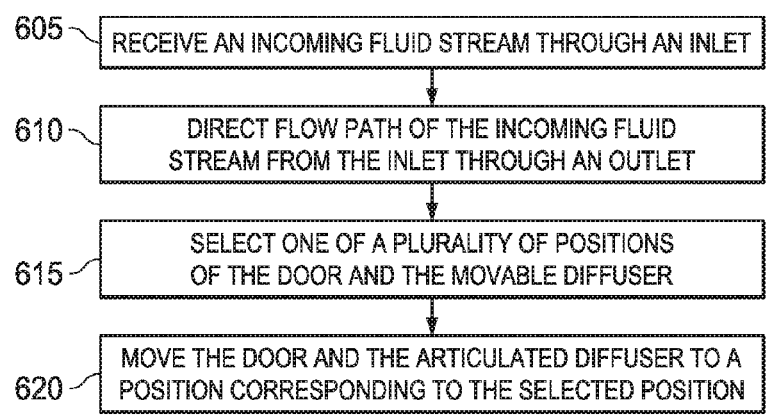
FIG. 6 illustrates a method for controlling an articulated diffuser and door for submerged ram air turbine power and cooling control according to embodiments of the present disclosure.

FIG. 6 illustrates a method 600 for controlling the articulated diffuser and door for submerged ram air turbine power and cooling control according to embodiments of the present disclosure. The method 600 can be used for controlling a flow path of an incoming fluid stream through a channel of a bypass fluid duct. The method 600 can be implemented by an exhaust system 400 or by an actuator 500. The embodiment of the process 600 shown in FIG. 7 is for illustration only. Other embodiments could be used without departing from the scope of this disclosure.

In block 605, the exhaust system 400 receives an incoming fluid stream 415 in a first direction through an inlet 425.

In block 610, the exhaust system 400 directs the flow path of the incoming fluid stream 415 from the inlet 425 through the outlet 430a, 430a to join an ambient fluid flow. The exhaust system 400 bypasses the incoming fluid stream 415 around a turbine generator 455 by passing the incoming fluid stream 415 over an exterior surface of the aft IML 405.

In block 615, the exhaust system 400 selects one of a plurality of positions of the door and the moveable diffuser, including: an unextended position, a fully extended position, and a partially extended position between the unextended and fully extended positions. The selection of a performance mode is based on environmental characteristics (altitude, speed, and air temperature, air pressure) of the ambient fluid (air outside the pod). High altitudes and low speeds correspond to a cold air temperature, where the system selects a high power generation mode. The power generation mode corresponds to a door angle near a maximum door angle for reducing RAT back pressure and increasing power generation. Lower altitudes and high speeds correspond to warm air temperature, where the system selects a high cooling mode. The cooling mode corresponds to a door angle near the minimum door angle for increasing the turbine exhaust flow ratio of fluid through the aft heat exchangers 435 and in turn, increasing heat rejection from the turbine generator 455. The selection can be based on a performance envelope for the exhaust system 400.

In block 620, the exhaust system 400 pivots the door 410 to a door angle corresponding to the selected position. At the same time, the exhaust system 400 moves the articulated diffuser 440 to a location corresponding to the selected position. A movement of the door 410 and the articulated diffuser 440, from an unextended position to one of a fully extended position or a partially extended position between the unextended and fully extended positions, varies a shape and volume of the channel, yielding a change to the flow path. More particularly, the driver 504 determines the selected position, and in response, rotates the rotating platform 501 to position the door 510 at the door angle and to translate the articulated diffuser 540 to a location corresponding to the position selected in block 515.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A turbine exhaust system comprising:
   a bypass fluid duct comprising an outer exit shroud and an inner mold line (IML) forming a channel from an inlet of the bypass fluid duct to an outlet of the bypass fluid duct, the bypass fluid duct configured to:
   receive an incoming fluid stream in a first direction through the inlet,
   bypass the incoming fluid stream around a turbine generator, and
   direct a flow path of the incoming fluid stream from the inlet through the outlet to join an ambient fluid flow;
   a moveable diffuser configured to move from a forward location to an aft location; and
   a door configured to pivot from a minimum door angle to a maximum door angle, the door linked to the moveable diffuser;
   wherein the moveable diffuser and the door together form the outer exit shroud, and
   wherein the door and the moveable diffuser are configured to move, from an unextended position to one of a fully extended position or a partially extended position between the unextended and fully extended positions, to vary a shape and volume of the channel.

2. The turbine exhaust system of claim 1, wherein:
   the unextended position comprises: the door pivoted to the minimum door angle and the moveable diffuser located in the forward location;
   the fully extended position comprises: the door pivoted to the maximum door angle and the moveable diffuser located in the aft location; and
   the partially extended position comprises: the door pivoted to a door angle between the minimum door angle and the maximum door angle, and the moveable diffuser located between the forward and aft locations.

3. The turbine exhaust system of claim 1, wherein the door and the moveable diffuser are configured to move from the unextended position to the partially extended position to enlarge a cross sectional area of the outlet, and
   wherein the door and the moveable diffuser are configured to move from the fully extended position to the partially extended position to reduce the cross sectional area of the outlet.

4. The turbine exhaust system of claim 1, further comprising a heat exchanger within the channel and coupled to the IML, and
   wherein the bypass fluid duct is further configured to direct the flow path through the heat exchanger.

5. The turbine exhaust system of claim 4, wherein, when the door and the moveable diffuser are disposed in one of the partially extended position or the fully extended position, a first portion of the incoming fluid stream is directed through the heat exchanger, and a second portion of the incoming fluid stream is directed over the heat exchanger.

6. The turbine exhaust system of claim 1, wherein the moveable diffuser is further configured to move from the forward location to the aft location by linear translation.

7. The turbine exhaust system of claim 1, further comprising a single actuator configured to drive the door and the moveable diffuser.

8. The turbine exhaust system of claim 1, wherein the door is a single pivot door.

9. The turbine exhaust system of claim 1, wherein the incoming fluid stream is pressurized by and discharged from a ram air turbine prior to the inlet.

10. An actuator for moving a door and a moveable diffuser linked to the door of a bypass fluid duct, the bypass fluid duct including an outer exit shroud and an inner mold line (IML) forming a channel from an inlet of the bypass fluid duct to an outlet of the bypass fluid duct, the moveable diffuser configured to move from a forward location to an aft location, and the door configured to pivot from a minimum door angle to a maximum door angle, the actuator comprising:
- a door link configured to couple to the door;
- a diffuser link configured to couple to the diffuser;
- a rotating platform pivotally coupled to the door link and the diffuser link; and
- a driver configured to:
  - rotate the rotating platform; and
  - drive, by a single rotational motion of the rotating platform, the door and the moveable diffuser linked to the door to a plurality of positions, the positions including: an unextended position, a fully extended position, and a partially extended position between the unextended and fully extended positions.

11. The actuator of claim 10, wherein, when the door and the moveable diffuser are disposed in the unextended position, the door is pivoted to the minimum door angle and the moveable diffuser is located in the forward location.

12. The actuator of claim 10, wherein, when the door and the moveable diffuser are disposed in the fully extended position, the door is pivoted to the maximum door angle and the moveable diffuser is located in the aft location.

13. The actuator of claim 10, wherein, when the door and the moveable diffuser are disposed in the partially extended position, the door is partially extended and is pivoted to a door angle between the minimum door angle and the maximum door angle, and the moveable diffuser is located between the forward and aft locations.

14. A method of controlling a flow path of an incoming fluid stream through a channel of a bypass fluid duct, the bypass fluid duct including an outer exit shroud and an inner mold line (IML) forming the channel from an inlet of the bypass fluid duct to an outlet of the bypass fluid duct, the outer exit shroud formed by a door together with a moveable diffuser, the method comprising:
- receiving the incoming fluid stream in a first direction through the inlet;
- bypassing the incoming fluid stream around a turbine generator;
- directing the flow path of the incoming fluid stream from the inlet through the outlet to join an ambient fluid flow;
- selecting one of a plurality of positions of the door and the moveable diffuser, the plurality of positions including: an unextended position, a fully extended position, and a partially extended position between the unextended and fully extended positions;
- pivoting the door to a door angle corresponding to the selected position; and
- moving the moveable diffuser to a location corresponding to the selected position;
- wherein the door is linked to the moveable diffuser and a movement of the door and the moveable diffuser, from the unextended position to one of the fully extended position or the partially extended position, varies a shape and volume of the channel and yields a change to the flow path.

15. The method of claim 14, wherein:
- the unextended position comprises: the door pivoted to a minimum door angle and the moveable diffuser located in a forward location;
- the fully extended position comprises: the door pivoted to a maximum door angle and the moveable diffuser located in an aft location; and
- the partially extended position comprises: the door pivoted to a door angle between the minimum door angle and the maximum door angle, and the moveable diffuser located between the forward and aft locations.

16. The method of claim 14, wherein the movement of the door and the moveable diffuser from the unextended position to the partially extended position enlarges a cross sectional area of the outlet, and
wherein a movement of the door and the moveable diffuser from the fully extended position to the partially extended position reduces the cross sectional area of the outlet.

17. The method of claim 14, further comprising directing the flow path through a heat exchanger within the channel and coupled to the IML.

18. The method of claim 17, wherein, when the door and the moveable diffuser are disposed in one of the partially extended position or the fully extended position, a first portion of the incoming fluid stream is directed through the heat exchanger, and a second portion of the incoming fluid stream is directed over the heat exchanger.

19. The method of claim 14, further comprising:
driving, by a single actuator, the movement of the door and the moveable diffuser.

20. The method of claim 14, wherein the moveable diffuser is further configured to move from a forward location to an aft location by a linear translation motion.

21. The turbine exhaust system of claim 1, wherein the door is linked to the moveable diffuser by a rotating platform.

22. The method of claim 14, wherein the door is linked to the moveable diffuser by a driver that is configured to pivot the door and move the moveable diffuser.

* * * * *